(No Model.)
R. W. JONES.
SAFETY HITCHING LOOP AND STRAP.
No. 292,561. Patented Jan. 29, 1884.
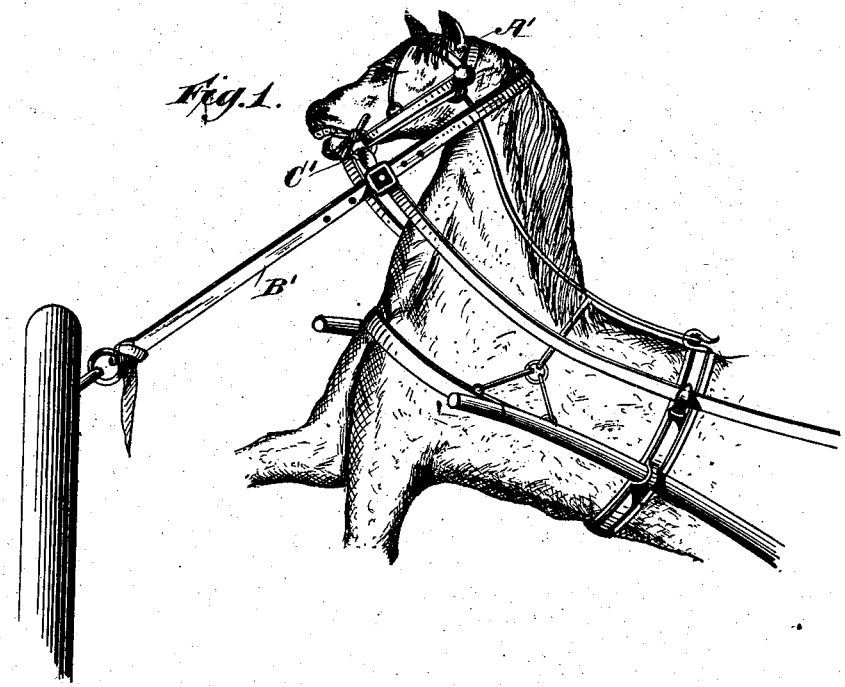
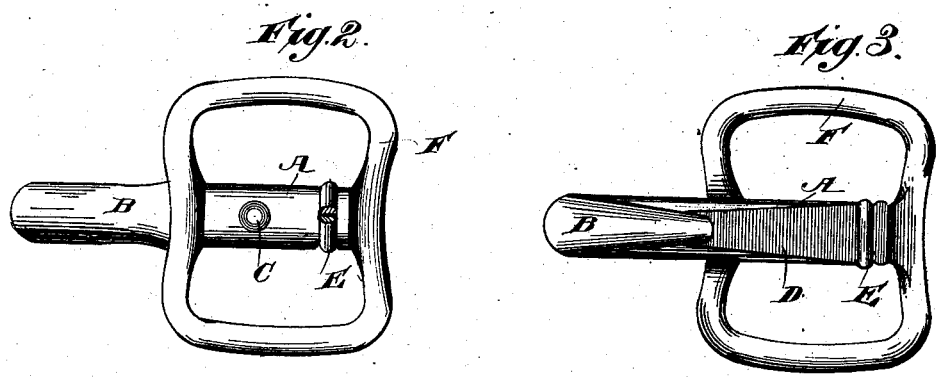
WITNESSES
INVENTOR
Richard W. Jones
Attorney

UNITED STATES PATENT OFFICE.

RICHARD W. JONES, OF SYRACUSE, NEW YORK.

SAFETY HITCHING LOOP AND STRAP.

SPECIFICATION forming part of Letters Patent No. 292,561, dated January 29, 1884.

Application filed December 13, 1883. (No model.)

*To all whom it may concern:*

Be it known that I, RICHARD W. JONES, a citizen of the United States, residing at Syracuse, in the county of Onondaga and State of New York, have invented certain new and useful Improvements in Safety Hitching Loops and Straps, of which the following is a specification, reference being had therein to the accompanying drawings.

Figure 1 is a view illustrating the use of my improved hitching-strap and snap-loop applied, showing its connection with an ordinary bridle. Fig. 2 is a top plan view of my improved snap-loop, and Fig. 3 is an inverted plan of the same.

My improvement relates to a safety hitching snap-loop and strap; and I will now proceed to describe the same, referring to the drawings and the letters of reference marked thereon.

A represents the shank of the snap-loop, which terminates at one end in the hook B, and has applied to its opposite end, on the upper side, a flat leaf-spring, D, which is secured to the shank by a metal clip, E, bent around the shank and spring-tongue, the free end of the latter resting against the under side of the beak of the hook; and the device thus far described is essentially like the common and well-known snap-hook inverted and without an end loop.

On the upper side of the shank A, which corresponds with the back of the common snap, I provide a loop or frame, F, and on the shank, at or near the center of the loop, the stud or pin C. This loop is shown in the drawings as substantially rectangular in form, but it may be of any ornamental shape or configuration.

All the parts of the device excepting the spring-tongue and its attaching-clip are cast integral. The hitching-strap B' is perforated at one end for the reception of the stud C, by which it is attached. The other end of the strap is passed through the loop, underneath the side bars thereof, and may be adjusted to form a loop that will fit the head of any animal. The snap-loop is adjusted to a point opposite or nearly opposite the bridle-ring C' on the bridle A', and is hooked therein. I thus construct a hitching device which, in addition to its attachment to the bit-ring, as in ordinary hitch-straps, has the additional security of a loop over the head of the animal. If desired, the spring-tongue might be riveted to the shank of the hook, or secured in any other well-known manner.

The loop is easily and cheaply cast, and may be readily applied to an ordinary strap by any person by merely punching a few holes therein.

The use of the device will be readily apparent. The snap is adjusted to suit the size of the animal's head. The loop formed is passed over it, and the snap, the hook of which is on the under or inner side, is fastened in the bit-ring of the bridle.

A hitching device constructed as above described will be found perfectly safe, and it is one which it is next to impossible for a vicious or unruly animal to break or tear.

Having thus fully described my invention, what I claim as new, and desire to secure by Letters Patent, is—

1. An inverted snap-hook having the loop F on its upper side, and the stud on its shank at or near the center of the loop, substantially as and for the purpose set forth.

2. The combination of the inverted snap having the loop F on its upper or outer side and the stud C on its shank, with the perforated hitching-strap and bridle-ring, substantially as and for the purpose set forth.

In testimony whereof I affix my signature in presence of two witnesses.

RICHARD W. JONES.

Witnesses:
HORACE H. WALPOLE,
CHAS. A. FOWLER,